United States Patent
Hirata et al.

(10) Patent No.: US 9,550,350 B2
(45) Date of Patent: Jan. 24, 2017

(54) OPTICAL DISPLAY PANEL PRODUCTION METHOD AND OPTICAL DISPLAY PANEL PRODUCTION SYSTEM

(71) Applicant: NITTO DENKO CORPORATION, Ibaraki-shi, Osaka (JP)

(72) Inventors: Satoshi Hirata, Ibaraki (JP); Seiji Kondo, Ibaraki (JP); Seiji Umemoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 338 days.

(21) Appl. No.: 14/379,354

(22) PCT Filed: Feb. 18, 2013

(86) PCT No.: PCT/JP2013/053860
§ 371 (c)(1),
(2) Date: Aug. 18, 2014

(87) PCT Pub. No.: WO2013/129160
PCT Pub. Date: Sep. 6, 2013

(65) Prior Publication Data
US 2015/0020960 A1    Jan. 22, 2015

(30) Foreign Application Priority Data

Feb. 29, 2012    (JP) .................................. 2012-043828

(51) Int. Cl.
*B32B 38/18* (2006.01)
*G02F 1/1333* (2006.01)
(Continued)

(52) U.S. Cl.
CPC ............... *B32B 38/18* (2013.01); *B32B 37/12* (2013.01); *B32B 37/22* (2013.01);
(Continued)

(58) Field of Classification Search
CPC ...... B32B 38/18; B32B 37/12; B32B 38/1866; B32B 37/22
See application file for complete search history.

(56) References Cited

U.S. PATENT DOCUMENTS

2004/0169786 A1    9/2004 Yamazaki et al.
2005/0016670 A1    1/2005 Kanbara et al.
(Continued)

FOREIGN PATENT DOCUMENTS

CN    101297339 A    10/2008
CN    101910924 A    12/2010
(Continued)

OTHER PUBLICATIONS

Notification of Transmittal of Translation of the International Preliminary Report on Patentability (Form PCT/IB/338) of International Application No. PCT/JP2013/053860 mailed Sep. 4, 2014 with form PCT/IPEA/409.
(Continued)

*Primary Examiner* — Daniel Lee
(74) *Attorney, Agent, or Firm* — Westerman, Hattori, Daniels & Adrian, LLP (57) ABSTRACT

An object of the invention is to provide a method for manufacturing an optical display panel. The method includes a feeding step including feeding an optical cell with a thickness of 0.2 mm to 1.0 mm by means of a feed roller unit arranged perpendicular to a direction in which the optical cell is fed; a bonding step including feeding a long carrier film from a continuous roll and bonding a sheet piece of the optical film to a lower surface of the optical cell with the pressure-sensitive adhesive interposed therebetween, wherein the lower surface is on a side in contact with the feed roller unit; and a rotation step including rotating the
(Continued)

optical cell by 90° with respect to the direction in which the optical cell is fed which is bonded in the bonding step.

8 Claims, 4 Drawing Sheets

(51) Int. Cl.
    *B32B 37/12*     (2006.01)
    *B32B 37/22*     (2006.01)

(52) U.S. Cl.
    CPC ........ *B32B 38/1866* (2013.01); *G02F 1/1333* (2013.01); *B32B 2307/42* (2013.01); *B32B 2329/04* (2013.01); *B32B 2457/20* (2013.01); *B32B 2551/00* (2013.01); *Y10T 156/1048* (2015.01)

(56) References Cited

U.S. PATENT DOCUMENTS

| | | | |
|---|---|---|---|
| 2009/0159175 | A1 | 6/2009 | Nakahira et al. |
| 2010/0276078 | A1 | 11/2010 | Kitada et al. |
| 2010/0316817 | A1 | 12/2010 | Kimura et al. |
| 2011/0083790 | A1 | 4/2011 | Kimura et al. |

FOREIGN PATENT DOCUMENTS

| | | | |
|---|---|---|---|
| CN | 102043279 A | | 5/2011 |
| JP | 2004-240412 A | | 8/2004 |
| JP | 2005-37417 A | | 2/2005 |
| JP | 2007-94253 A | | 4/2007 |
| JP | 2010-170126 A | | 8/2010 |
| JP | 2010170126 A | * | 8/2010 |
| JP | 4588783 B2 | | 12/2010 |
| JP | 2011-194560 A | | 10/2011 |
| JP | 2011-197651 A | | 10/2011 |
| TW | 201033687 A1 | | 9/2010 |
| TW | 201137461 A1 | | 11/2011 |

OTHER PUBLICATIONS

International Search Report dated Apr. 16, 2013, issued in corresponding application No. PCT/JP2013/053860.

Notice of Allowance dated Dec. 31, 2015, issued in counterpart Taiwanese Patent Application No. 102106577. (4 pages).

Office Action dated May 3, 2016, issued in counterpart Chinese Patent Application No. 201380007554.8, with English translation. (10 pages).

* cited by examiner

OPTICAL DISPLAY PANEL PRODUCTION METHOD AND OPTICAL DISPLAY PANEL PRODUCTION SYSTEM

TECHNICAL FIELD

The invention relates to a method and a system for manufacturing an optical display panel by a process including feeding a long carrier film from a continuous roll, which is a roll of a laminate including the long carrier film and a pressure-sensitive adhesive-bearing optical film with a specific width placed on the carrier film, and bonding the optical film, which is being peeled off or peeled off from the carrier film, to an optical cell with the pressure-sensitive adhesive interposed therebetween.

BACKGROUND ART

A known process for manufacturing an optical display panel includes unwinding a long carrier film from a continuous roll of a laminate including the long carrier film and a polarizing film placed thereon; peeling off the polarizing film from the carrier film; and bonding the polarizing film to each of first and second cell surfaces of an optical cell (see Patent Document 1). In such a manufacturing process, a large number of cylindrical feed rollers (feed rollers) are arranged so as to rotate along the optical cell feed direction and used to feed the optical cell and the optical cell with the polarizing film bonded thereto (the optical display panel). When such feed rollers are used to feed the optical cell, the contact area between the feed rollers and the optical cell surface can be kept small. On the other hand, when feeding means based on surface contact, such as a belt conveyor is used, dust or dirt deposited on the conveyor side can transfer to the bonded surface of an optical cell to cause a display failure. This is one reason why feed rollers should be used.

It is also proposed that a polarizing film should be bonded first to the surface of an optical cell on the side in contact with feed rollers so that the period in which the optical cell surface is directly in contact with the feed rollers can be shortened (see Patent Document 2).

PRIOR ART DOCUMENTS

Patent Documents

Patent Document 1: JP-A-2005-37417
Patent Document 2: Japanese Patent No. 4588783

SUMMARY OF THE INVENTION

Problems to be Solved by the Invention

Figure 4A:
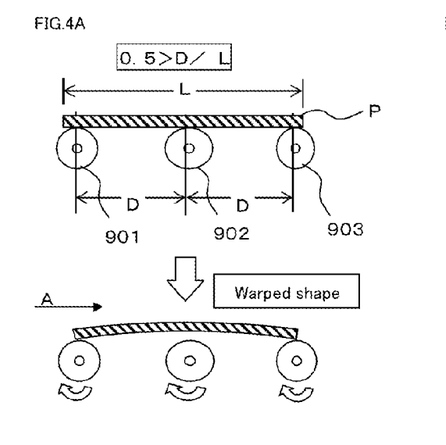
FIG. 4A is a diagram for illustrating the relation 0.5>D/L.
Figure 4B:
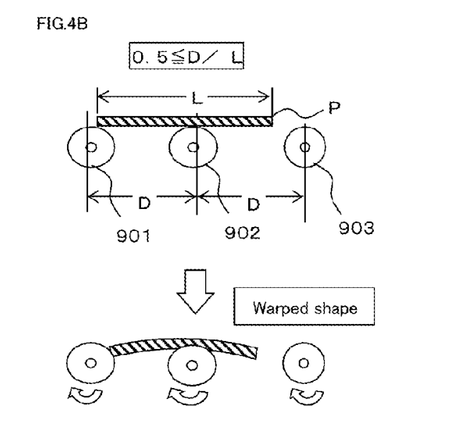
FIG. 4B is a diagram for illustrating the relation 0.5≤D/L.

Recently, however, smaller and thinner optical cells have become available, and when a polarizing film is bonded to the lower surface of an optical cell on the side in contact with feed rollers as mentioned above, the tension on the polarizing film during the bonding can cause the optical cell to be warped upward (or curved convex) in the middle when the optical cell is viewed from the side along the feed direction (see FIGS. 4A and 4B). Due to this warpage, the ends (front and back ends) of the optical cell can fall into between adjacent feed rollers and come into contact with a feed roller (or collide with the surface of a feed roller) (see FIG. 5). This contact can cause the end of the optical cell to crack or chip, which can reduce the bonding yield (productivity) in the process of bonding to the optical cell.

The invention, which has been accomplished in view of the circumstances, provides a method and a system for manufacturing an optical display panel by a process including rotating an optical cell by 90° after the bonding of an optical film so that the end of the optical cell can be prevented from falling into the gap between adjacent feed rollers and thus from being cracked or chipped even though the optical film is bonded first to the lower surface of the optical cell so that the optical cell is warped upward (or curved convex) in the middle when viewed from the side along the feed direction.

The invention is directed to a method for manufacturing an optical display panel, includes
a feeding step including feeding an optical cell with a thickness of 0.2 mm to 1.0 mm by means of a feed roller unit arranged perpendicular to a direction in which the optical cell is fed;
a bonding step including feeding a long carrier film from a continuous roll, wherein the continuous roll is a roll of a laminate comprising the long carrier film and a pressure-sensitive adhesive-bearing optical film with a specific width placed on the carrier film, and bonding a sheet piece of the optical film, which is being peeled off or peeled off from the carrier film, to a lower surface of the optical cell with the pressure-sensitive adhesive interposed therebetween, wherein the lower surface is on a side in contact with the feed roller unit; and
a rotation step including rotating the optical cell by 90° with respect to the direction in which the optical cell is fed, wherein the lower surface of the optical cell is covered with the sheet piece, which is bonded in the bonding step.

These steps allow the optical cell to be curved as follows. After the bonding step, the optical cell is curved convex upward when viewed from the side along the direction in which the optical cell is fed, and after the rotation step, the optical cell is curved convex upward when viewed from the front side with respect to the direction in which the optical cell is fed.

Means for Solving the Problems

According to this feature, the optical cell is rotated by 90° with respect to the feed direction after the optical film is bonded to the lower surface of the optical cell, so that such a state that the optical cell is warped upward (or curved convex) in the middle when viewed from the side along the feed direction is changed to such a state that the optical cell is warped upward (or curved convex) in the middle when viewed from the front side with respect to the feed direction. This makes it possible to prevent the end of the optical cell from falling into the gap between adjacent feed rollers, feed the optical cell stably, and prevent the end of the optical cell from being cracked or chipped.

As used herein, the term "rotated by 90°" means such a state that the long or short side of the optical cell after the rotation (or turning) is parallel to its short or long side before the rotation (or turning). The term "turning" means that the optical cell is turned upside down and rotated by 90°.

After the bonding step, the number of times the end of the optical cell falls into the gap between feed rollers is preferably as small as possible, and, for example, is preferably at most three, more preferably at most one. In a preferred mode, the distance between the bonding step and the rotation step is made short, and a smaller number of rollers are placed. Alternatively, after the bonding step, a negative pressure suction plate unit may be used to suck the lower or upper surface of the optical cell and feed the optical cell. The negative pressure suction plate unit may rotate by 90° so as to rotate the optical cell by 90° with respect to the feed direction.

The expression "a feed roller unit arranged perpendicular to a direction in which the optical cell is fed" is intended to include cases where the feed roller unit is substantially or almost perpendicular to the feed direction, and refers to an arrangement that allows the optical cell to be fed in the feed direction as the rollers of the feed roller unit rotate.

The expression "the optical cell is warped upward (or curved convex) in the middle" is intended to include cases where both ends (the ends of the opposite sides) or one of the ends is curved downward (or to the floor side).

The optical cell has a thickness of 0.2 mm to 1.0 mm. This is because as the thickness of the optical cell decreases to less than 1.0 mm, the optical cell becomes more likely to be warped (or curved) by the tension on the optical film during the bonding. The optical cell with a thickness of less than 0.2 mm can be excessively warped to have significantly degraded display characteristics, which will make it difficult to produce a desired product with the optical cell even when the optical cell is fed in such a way that the end of the optical cell is prevented from falling into the gap between feed rollers.

In an embodiment of the invention, the surface of the optical cell is rectangular,
the feeding step includes feeding the optical cell by means of the feed roller unit in such a way that a short side of the optical cell is in the same direction as the direction in which the optical cell is fed, and
the bonding step includes bonding the sheet piece to the lower surface of the optical cell with the pressure-sensitive adhesive interposed therebetween.

The feeding step is performed before the rotation step.

According to this feature, the optical cell has short and long sides (or transverse and longitudinal lengths) and is more influenced by the warpage after the bonding, so that the end of the optical cell is more likely to fall into the gap between adjacent feed rollers. Thus, the invention can be more effective when the short side of the optical cell is in the same direction as the optical cell feed direction than when the long side is in the same direction as the feed direction.

In an embodiment of the invention, the short side of the optical cell has a length of 100 mm to 230 mm, and
the optical cell has a long side with a length of 170 mm to 340 mm.

According to this feature, as the size of the optical cell decreases, the end of the optical cell becomes more likely to fall into the gap between adjacent feed rollers due to the influence of the warpage after the bonding. Thus, the invention is more effective on relatively small optical cells than on relatively large optical cells.

In an embodiment of the invention, the optical cell has a side with a length L in the direction where the optical cell is fed, the feed roller unit has a distance D between adjacent roller axes, and the relation 0.5>D/L is satisfied.

According to this feature, the feed roller unit is used to feed the optical cell until the rotation step after the bonding step. In this case, when the relation 0.5>D/L is satisfied, the end of the optical cell is more effectively prevented from falling into the gap between feed rollers and from being cracked or chipped. In a more preferred mode, the relation 0.3>D/L is satisfied. On the other hand, if 0.5≤D/L, the end of the optical cell may be more likely to fall into the gap between feed rollers and crack or chip.

In an embodiment of the invention, the bonding step (first bonding step) and the rotation step may be followed by a second bonding step that includes feeding a second long carrier film from a second continuous roll, wherein the second continuous roll is a roll of a laminate including the second long carrier film and a pressure-sensitive adhesive-bearing second optical film with a specific width placed on the carrier film, and bonding a second sheet piece of the second optical film, which is being peeled off or peeled off from the second carrier film, to the surface of the optical cell with the pressure-sensitive adhesive interposed therebetween, wherein the surface to which the second sheet piece is bonded is opposite to the surface to which the sheet piece (first sheet piece) of the optical film (first optical film) is bonded. In the second bonding step, the second sheet piece of the second optical film may be bonded to the upper surface of the optical cell (the surface not in contact with the feed rollers). The manufacturing method may further include a turnover step including turning the optical cell upside down before the second bonding step, and in the second bonding step, the second sheet piece of the second optical film may be bonded to the lower surface of the optical cell (the surface on the side in contact with the feed rollers). The manufacturing method may include a turning step including the rotation step and the turnover step, in which the rotation step and the turnover step may be simultaneously performed.

In an embodiment of the invention, the second bonding step may be followed by a third bonding step that includes bonding a third sheet piece of a third optical film to the first or second sheet piece to form a laminate.

The invention is also directed to a system for manufacturing an optical display panel, includes:
a feed roller unit configured to feed an optical cell with a thickness of 0.2 mm to 1.0 mm and arranged perpendicular to a direction in which the optical cell is to be fed;
a bonding unit configured to feed a long carrier film from a continuous roll, wherein the continuous roll is a roll of a laminate comprising the long carrier film and a pressure-sensitive adhesive-bearing optical film with a specific width placed on the carrier film, and to bond a sheet piece of the optical film, which is being peeled off or peeled off from the carrier film, to a lower surface of the optical cell with the pressure-sensitive adhesive interposed therebetween, wherein the lower surface is on a side in contact with the feed roller unit; and
a rotation unit configured to rotate the optical cell by 90° with respect to the direction in which the optical cell is fed, wherein the lower surface of the optical cell is covered with the sheet piece, which is bonded in the bonding unit.

The bonding unit is configured to bond the sheet piece to the lower surface of the optical cell so that the optical cell is curved convex upward when viewed from the side along the direction in which the optical cell is fed, and the rotation unit is configured to rotate the optical cell by 90° with respect to the direction in which the optical cell is fed so that the optical cell is curved convex upward when viewed from the front side with respect to the direction in which the optical cell is fed.

According to this feature, the optical cell is rotated by 90° with respect to the feed direction after the optical film is bonded to the lower surface of the optical cell, so that such a state that the optical cell is warped upward (or curved convex) in the middle when viewed from the side along the feed direction is changed to such a state that the optical cell is warped upward (or curved convex) in the middle when viewed from the front side with respect to the feed direction. This makes it possible to prevent the end of the optical cell from falling into the gap between adjacent feed rollers, feed the optical cell stably, and prevent the end of the optical cell from being cracked or chipped.

After the bonding process in the bonding unit, the number of times the end of the optical cell falls into the gap between feed rollers is preferably at most three, more preferably at most one, even more preferably zero. In a preferred mode, the distance between the bonding unit and the rotation unit is made short, and a smaller number of rollers are placed. Alternatively, a negative pressure suction plate unit may be used to suck the lower or upper surface of the optical cell and feed the optical cell from the bonding unit. The negative pressure suction plate unit may rotate by 90° so as to rotate the optical cell by 90° with respect to the feed direction.

In an embodiment of the invention, the surface of the optical cell is rectangular, the feed roller unit is configured to feed the optical cell in such a way that a short side of the optical cell is in the same direction as the direction in which the optical cell is fed, and the bonding unit is configured to bond the sheet piece to the lower surface of the optical cell with the pressure-sensitive adhesive interposed therebetween.

The feed roller unit is placed upstream of the rotation unit.

In an embodiment of the invention, the short side of the optical cell has a length of 100 mm to 230 mm, and the optical cell has a long side with a length of 170 mm to 340 mm.

In an embodiment of the invention, the optical cell has a first side with a length L in the direction where the optical cell is fed, the feed roller unit has a distance D between adjacent roller axes, and the relation 0.5>D/L is satisfied.

In an embodiment of the invention, the manufacturing system further includes a second bonding unit that is configured to feed a second long carrier film from a second continuous roll, wherein the second continuous roll is a roll of a laminate including the second long carrier film and a pressure-sensitive adhesive-bearing second optical film with a specific width placed on the carrier film, and to bond a second sheet piece of the second optical film, which is being peeled off or peeled off from the second carrier film, to the surface of the optical cell with the pressure-sensitive adhesive interposed therebetween, wherein the surface to which the second sheet piece is bonded is opposite to the surface to which the sheet piece (first sheet piece) of the optical film (first optical film) is bonded. The second bonding unit may be configured to bond the second sheet piece of the second optical film to the upper surface of the optical cell (the surface not in contact with the feed rollers). The manufacturing system may further include a turnover unit configured to turn the optical cell upside down before the bonding process in the second bonding unit, and the second bonding unit may be configured to bond the second sheet piece of the second optical film to the lower surface of the optical cell (the surface on the side in contact with the feed rollers). The rotation unit and the turnover unit may form a turning unit, which is configured to perform the rotation and the turnover simultaneously.

In an embodiment of the invention, the manufacturing system further includes a third bonding unit that is configured to bond a third sheet piece of a third optical film to the first or second sheet piece to form a laminate after the bonding process in the second bonding unit.

In an embodiment of the invention, the first bonding unit has a bonding roller, which is configured to press the first sheet piece of the first optical film against the optical cell surface on the side in contact with the feed roller unit, and a backing roller opposed to the bonding roller. The first bonding unit is configured to bond the first sheet piece of the first optical film to the optical cell surface on the side in contact with the feed roller unit while holding the first sheet piece and the optical cell between the bonding roller and the backing roller and feeding them.

In an embodiment of the invention, the second bonding unit has a bonding roller, which is configured to press the second sheet piece of the second optical film against the optical cell surface on the side not in contact with the feed roller unit, and a backing roller opposed to the bonding roller. The second bonding unit is configured to bond the second sheet piece of the second optical film to the optical cell surface on the side not in contact with the feed roller unit while holding the second sheet piece and the optical cell between the bonding roller and the backing roller and feeding them.

MODE FOR CARRYING OUT THE INVENTION

The optical film may be of any type having a pressure-sensitive adhesive layer as an outermost layer, and it may be a monolayer structure or a multilayer structure. For example, the optical film may be a plastic film with a thickness of about 5 μm to about 200 μm.

The optical film may also be, for example, a polarizer or a polarizing film, and the polarizing film may have a structure including a polarizer and a polarizer-protecting film or films placed on one or both sides of the polarizer. A surface protecting film or films may also be placed thereon to protect the polarizer or the polarizing film from scratches and other damage during transportation. Other examples of the optical film include optical compensation films such as retardation films and brightness enhancement films. The multilayer-structure optical film may include a polarizer or a polarizing film and a retardation film and/or a brightness enhancement film placed on the polarizer or polarizing film. Hereinafter, the term "MD polarizing film" may refer to a long polarizing film having an absorption axis in the longitudinal direction, in which the polarizer has an absorption axis in the stretched direction (or a long polarizing film having a transmission axis in the transverse direction (its widthwise direction), and the term "TD polarizing film" may refer to a long polarizing film having an absorption axis in the transverse direction (its widthwise direction).

The polarizing film may be, for example, a dichroic polarizing film. The dichroic polarizing film may be manufactured by a process including the steps of (A) dyeing, crosslinking, stretching, and drying a polyvinyl alcohol-based film to obtain a polarizer; (B) bonding a protecting layer or layers (a polarizer-protecting film or films) to one or both sides of the polarizer; and (C) heat-treating the resulting laminate. Dyeing, crosslinking, and stretching of the polyvinyl alcohol-based film do not have to be each independently performed, and may be performed simultaneously, or they may be performed in any order. It will be understood that a polyvinyl alcohol-based film having undergone a swelling treatment may also be used as the polyvinyl alcohol-based film. In general, the polyvinyl alcohol-based film is immersed in a solution containing iodine or a dichroic dye so that the film is dyed with the adsorbed iodine or dichroic dye, then cleaned, uniaxially stretched to a stretch ratio of 3 to 7 in a solution containing boric acid or borax and other additives, and then dried.

The brightness enhancement film may be, for example, a reflective polarizing film having a multilayer structure with a reflection axis and a transmission axis. For example, the reflective polarizing film can be obtained by alternately stacking a plurality of polymer films A and B made of two different materials and stretching them. The refractive index of only the material A is changed and increased in the stretching direction, so that birefringence is produced, in which a reflection axis is formed in the stretching direction where there is a difference in refractive index at the material A-B interface, and a transmission axis is formed in the direction (non-stretching direction) where no difference in refractive index is produced. This reflective polarizing film has a transmission axis in the longitudinal direction and an absorption axis in the transverse direction (its widthwise direction).

The pressure-sensitive adhesive in the outermost layer of the optical film is typically, but not limited to, an acrylic pressure-sensitive adhesive, a silicone-based pressure-sensitive adhesive, a urethane-based pressure-sensitive adhesive, or the like. For example, a plastic film (such as a polyethylene terephthalate-based film or a polyolefin-based film) or any other film may be used to form the carrier film. Any appropriate film such as a film coated with an appropriate release agent such as a silicone, long-chain alkyl or fluoride release agent, or molybdenum sulfide may also be used as needed.

In an embodiment of the invention, the optical film may be formed in any manner on the carrier film. For example, they may be wound to form a continuous roll. The continuous roll may be, for example, (1) a roll of an optical film laminate including a carrier film and a pressure-sensitive adhesive-bearing optical film formed on the carrier film. In this case, the system for manufacturing an optical display panel has cutting means for cutting the optical film into sheet pieces of the optical film in such a manner that the optical film (bearing the pressure-sensitive adhesive) is cut at predetermined intervals while the carrier film is left uncut (cutting means for performing half-cutting). For example, the cutting may be performed in such a manner as to classify non-defective and defective sheet pieces based on the result of an inspection performed using a defect inspection apparatus in the manufacturing system.

Alternatively, for example, the continuous roll may be (2) a roll of an optical film laminate including a carrier film and sheet pieces of pressure-sensitive adhesive-bearing optical film formed on the carrier film (a continuous roll of what is called a scored optical film).

The optical display panel includes an optical cell and at least a sheet piece or pieces of polarizing film provided on one or both sides of the optical cell, into which a driving circuit is incorporated as needed. The optical cell may be, for example, a liquid crystal cell or an organic electroluminescent (EL) cell. The liquid crystal cell may be of any type such as a vertical alignment (VA) type or an in-plane switching (IPS) type. The liquid crystal cell P shown in FIG. 2 has a structure including a pair of substrates (a first substrate Pa and a second substrate Pb) opposed to each other and a liquid crystal layer sealed in between the substrates. The optical cell has a thickness of 0.2 mm to 1.0 mm.

Embodiment 1

Method for Manufacturing Optical Display Panel

Figure 1:
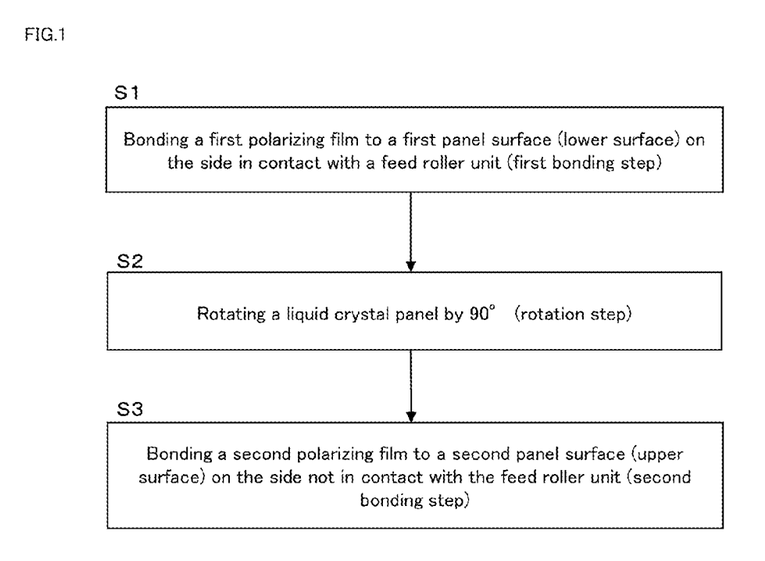
FIG. 1 is a flow chart of an optical display panel manufacturing method according to Embodiment 1.

FIG. 1 is a flow chart showing a manufacturing method according to Embodiment 1. The process flow of FIG. 1 further includes a second bonding step after a rotation step. The second bonding step includes bonding a second sheet piece of a second polarizing film to a second cell surface (an upper surface) of an optical cell with a pressure-sensitive adhesive interposed therebetween, wherein the second cell surface is opposite to its surface to which a first sheet piece of a first polarizing film is bonded.

(First Bonding Step)

In a first carrier film feeing step, a first polarizing film laminate (a laminated film including a carrier film and a polarizing film placed thereon) is unwound from a first continuous roll and fed downstream. In the process of the feeding, the first polarizing film is cut at specific intervals in the film widthwise direction perpendicular to the longitudinal direction, while the first carrier film is left uncut, so that a first sheet piece of the first polarizing film is formed on the carrier film. When the first continuous roll is a continuous roll of a scored polarizing film as mentioned above, this cutting step is unnecessary. A peeling step includes inwardly folding back the first carrier film at a front end part of a peeling unit so that the first sheet piece of the first polarizing film is peeled off from the first carrier film and supplied to the bonding position in a first bonding unit. During this step, a feed roller unit feeds an optical cell to the bonding position in the first bonding unit (feeding step) while the first cell surface (lower surface) of the optical cell is in contact with the feed roller unit (or faces the floor surface). The first bonding unit used in the first bonding step has a bonding roller, which is configured to press the first sheet piece of the first optical film against the first cell surface (lower surface), and a backing roller opposed to the bonding roller. The first bonding unit bonds the first sheet piece of the first polarizing film, which has an absorption axis in its longitudinal direction, to the first cell surface (lower surface) of the optical cell, which faces the floor surface, while it holds the first sheet piece of the first optical film and the optical cell between the bonding roller and the backing roller and feeds them (step S1).

(Rotation Step)

The optical cell with the first sheet piece of the first polarizing film bonded thereto is then rotated by 90° with respect to the feed direction (rotation step or step S2). The rotation step can be performed using a rotation unit 80 as described below.

(Second Bonding Step)

In a second carrier film feeing step, a second polarizing film laminate (a laminated film including a second carrier film and a second polarizing film placed thereon) is unwound from a second continuous roll and fed downstream. In the process of the feeding, the second polarizing film is cut at specific intervals in the film widthwise direction perpendicular to the longitudinal direction, while the second carrier film is left uncut, so that a second sheet piece of the second polarizing film is formed on the second carrier film. When the second continuous roll is a continuous roll of a scored polarizing film as mentioned above, this cutting step is unnecessary. A peeling step includes inwardly folding back the second carrier film at a front end part of a peeling unit so that the second sheet piece of the second polarizing film is peeled off from the second carrier film and supplied to the bonding position in a second bonding unit. During this step, a feed roller unit feeds the optical cell to the bonding position in the second bonding unit (feeding step) while the first cell surface (with the first polarizing film bonded thereto) of the optical cell is in contact with the feed roller unit (or faces the floor surface). The second bonding unit used in the second bonding step has a bonding roller, which is configured to press the second sheet piece of the second optical film against the second cell surface (upper surface), and a backing roller opposed to the bonding roller. The second bonding unit bonds the second sheet piece of the second polarizing film, which has an absorption axis in its longitudinal direction, to the second cell surface (upper surface) of the optical cell, while it holds the second sheet piece of the second optical film and the optical cell between the bonding roller and the backing roller and feeds them (step S3).

(Optical Display Panel Manufacturing System)

The optical display panel manufacturing system is a system for manufacturing the optical display panel. The system includes a feed roller unit arranged perpendicular to the optical cell feed direction and configured to feed the optical cell;

a first bonding unit configured to feed a first long carrier film from a first continuous roll, which is a roll of a laminate including the first long carrier film and a pressure-sensitive adhesive-bearing first polarizing film with a specific width placed on the carrier film, and to bond a first sheet piece of the first polarizing film, which is being peeled off or peeled off from the first carrier film, to a first cell surface (lower surface) of the optical cell with the pressure-sensitive adhesive interposed therebetween, wherein the first cell surface is on the side in contact with the feed roller unit; and a rotation unit configured to rotate the optical cell by 90° with respect to the optical cell feed direction, wherein the first sheet piece has been bonded to the first cell surface (lower surface) of the optical cell in the first bonding unit.

In this embodiment, the system further includes a second bonding unit that is used after the process in a rotation unit 80 and configured to feed a second long carrier film from a second continuous roll, which is a roll of a laminate including the second long carrier film and a pressure-sensitive adhesive-bearing second polarizing film with a specific width placed on the carrier film, and to bond a second sheet piece of the second polarizing film, which is being peeled off or peeled off from the second carrier film, to a second cell surface (upper surface) of the optical cell with the pressure-sensitive adhesive interposed therebetween, wherein the second cell surface is opposite to the surface to which the first sheet piece of the first polarizing film is bonded.

Hereinafter, the optical display panel manufacturing system of Embodiment 1 will be described with reference to FIGS. 2 and 3. The manufacturing system includes a plurality of sheet piece lamination apparatuses each having a carrier film feeding unit, a peeling unit, and a bonding unit. A first sheet piece lamination apparatus 100 is configured to place a first sheet piece of a first polarizing film on a first cell surface (lower surface) of an optical cell and bond, to the first cell surface, the first sheet piece in a direction along (parallel to) the short side of the optical cell. A second sheet piece lamination apparatus 200 is configured to place a second sheet piece of a second polarizing film on a second cell surface (upper surface) of the optical cell, opposite to the first cell surface, and bond, to the second cell surface, the second sheet piece in a direction along (parallel to) the long side of the optical cell.

Figure 2:
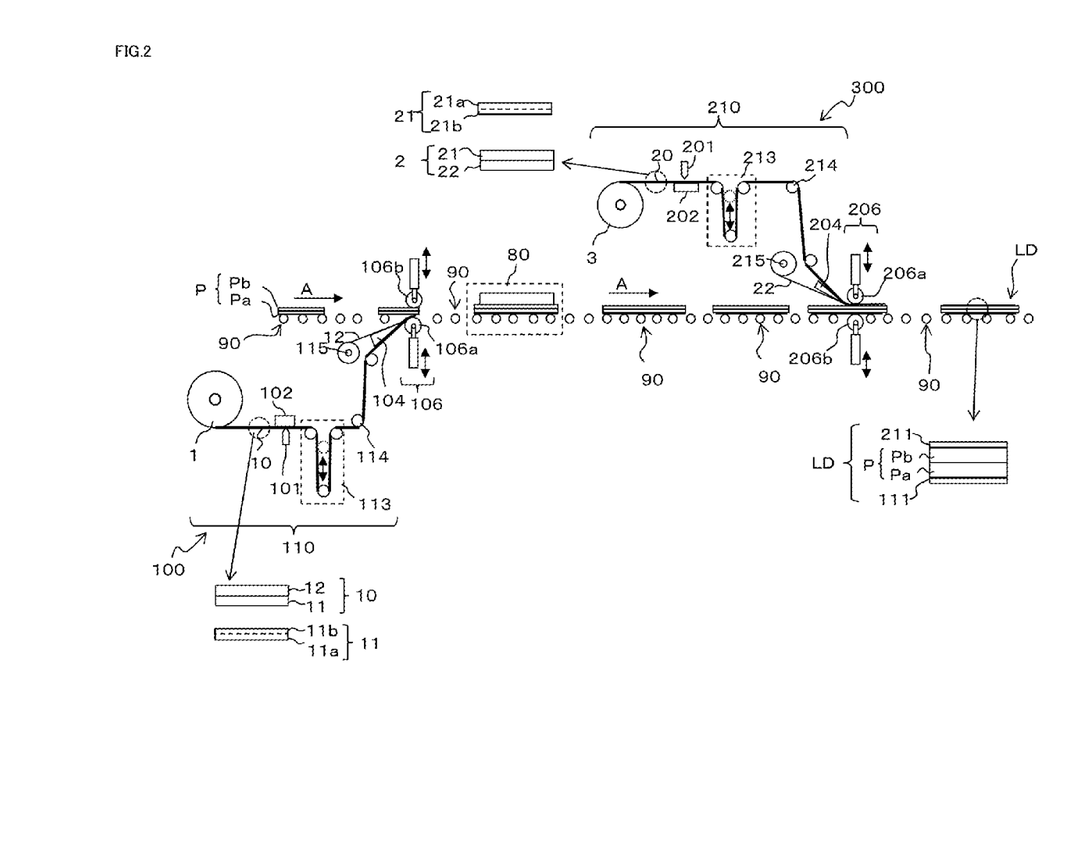
FIG. 2 is a diagram for illustrating an optical display panel manufacturing system according to Embodiment 1.
Figure 3:
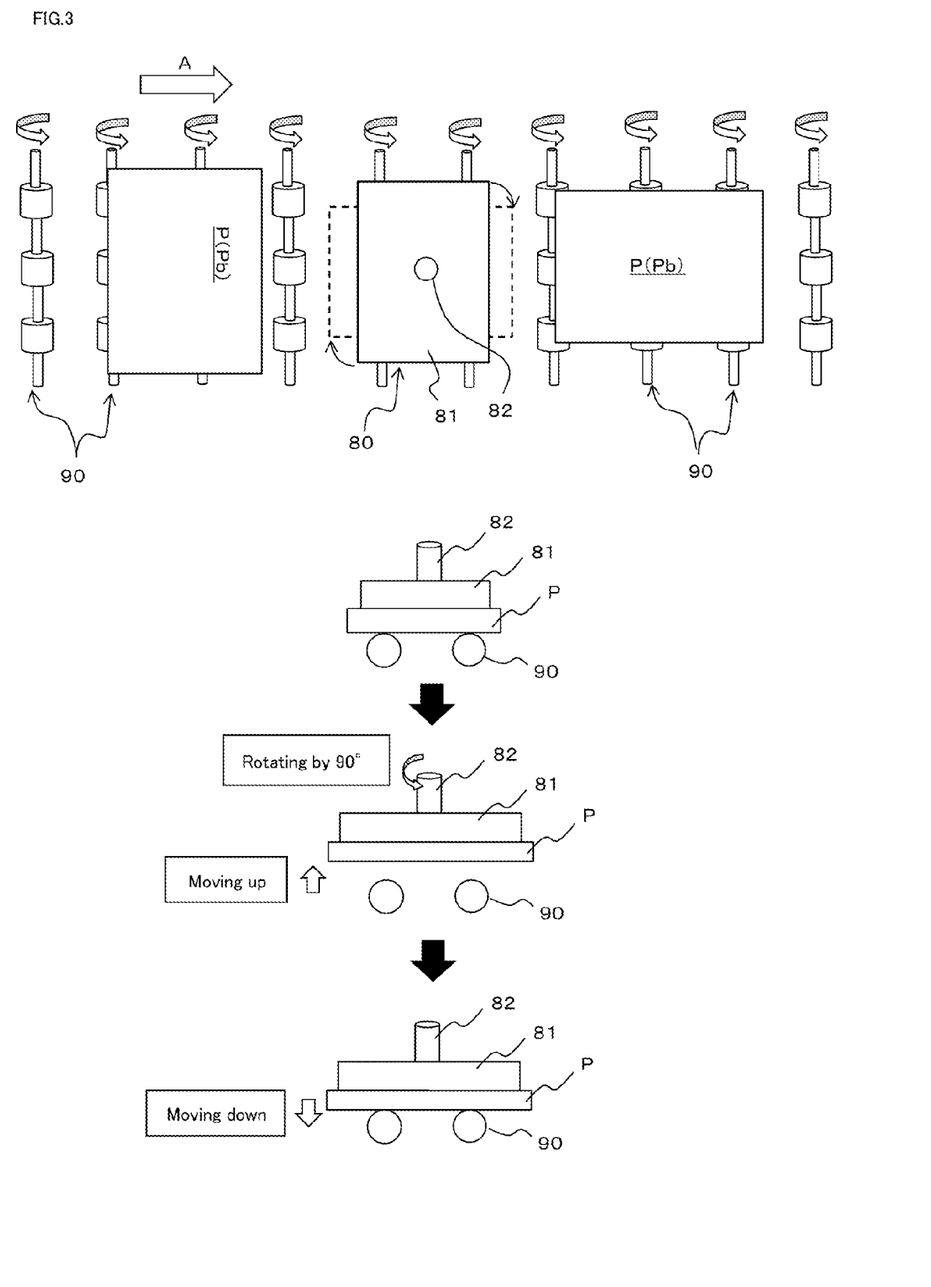
FIG. 3 is a diagram for illustrating a rotation unit (rotation step)

As shown in FIG. 2, the first sheet piece lamination apparatus 100 includes a carrier film feeding unit 110, a feed roller unit 90 for feeding an optical cell, a peeling unit 104, and a first bonding unit 106. The second sheet piece lamination apparatus 200 includes a carrier film feeding unit 210, a feed roller unit 90 for feeding an optical cell, a peeling unit 204, and a second bonding unit 206.

In this embodiment, the feed roller unit 90 is configured to feed the optical cell P to the first bonding unit 106 in such a way that the short side of the optical cell P is directed parallel to the panel feed direction A. The sheet piece 111 of the first polarizing film 11 is then bonded, in a direction along the short side of the optical cell P, to the first cell surface Pa (the lower surface in FIG. 2) of the optical cell P. A rotation unit 80 then rotates, by 90°, the optical cell P with the sheet piece 111 bonded thereto. After the rotation, therefore, the feed roller unit 90 feeds the optical cell P to the second bonding unit 206 in such a way that the long side of the optical cell P is directed parallel to the panel feed direction A.

Figure 5:
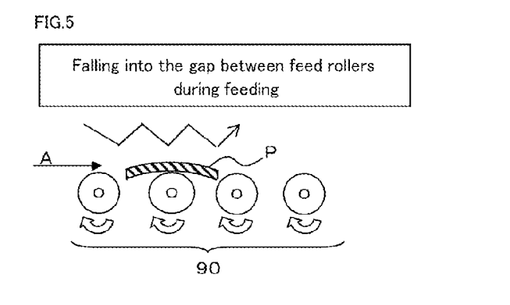
FIG. 5 is a diagram showing a case where an optical cell falls into a gap between feed rollers.
Figure 6:
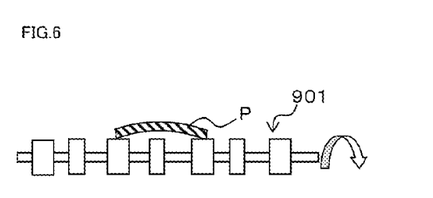
FIG. 6 is a diagram showing the condition of an optical cell after a rotation process.

A tension is applied on the sheet piece when the first bonding unit 106 bonds the first sheet piece to the optical cell P. After the bonding, therefore, the optical cell P is curved convex with the first cell surface Pa curved inward, when viewed from the side along the feed direction A (or curved in such a way that the side of the panel has a reduced length in the feed direction A) (see FIGS. 4A and 5). If the optical cell is fed in such a curved state, the end of the optical cell can fall into a gap between adjacent feed rollers (901, 902, 903), so that the end can be cracked or chipped. Thus, the rotation unit 80 rotates the optical cell by 90° with respect to the feed direction, so that the orientation of the optical cell is changed to such an orientation that the optical cell is curved convex when viewed from the front side with respect to the feed direction A (or viewed in a direction perpendicular to the feed direction A), which prevents the end of the optical cell P from falling into the gap between adjacent feed rollers (901, 902, 903). As shown in FIG. 6, the optical cell P is fed in such a way that the end of the optical cell P is prevented from falling into the gap between adjacent feed rollers (901, 902, 903), so that the optical cell P is stably fed without being cracked or chipped at the end.

The optical cell is rectangular, and the feed roller unit 90 is configured to feed the optical cell P in such a way that the short side (transverse side) of the optical cell P is in the same direction as the feed direction A. The invention is also advantageous when the short side of the optical cell P has a length of 100 mm to 230 mm and the long side of the optical cell P has a length of 170 mm to 340 mm.

In this embodiment, the distance (D) between adjacent roller axes is preferably less than ½, more preferably less than ⅓, even more preferably ⅕ of the length of the short side (from 100 mm to 230 mm).

In this embodiment, the relation 0.5>D/L is satisfied, wherein L is the length of a first side of the optical cell P, the first side being in the same direction as the feed direction A, and D is the distance between adjacent roller axes of the feed roller unit 90. FIG. 4A is a schematic diagram showing that this relation is satisfied. On the other hand, FIG. 4B shows that this relation is not satisfied, namely, shows the relation 0.5≤D/L. In the case of FIG. 4B, the end of the optical cell can fall into a gap between feed rollers as shown in FIG. 5.

The second sheet piece 211 of the second polarizing film 21 is then bonded, in a direction along the long side of the optical cell P, to the second cell surface Pb (the upper surface in FIG. 2) of the optical cell P.

(Sheet Piece Lamination Apparatus)

First, the first sheet piece lamination apparatus 100 will be described. The feed roller unit 90 is configured to feed the optical cell P in the feed direction A to the first bonding unit 106. In this embodiment, the feed roller unit 90 includes a plurality of feed rollers. It is configured to feed the optical cell P to the downstream side of the manufacturing line by rotating the feed rollers.

The carrier film feeding unit 110 is configured to unwind the first long polarizing film laminate 10 from the first continuous roll 1, wherein the first polarizing film laminate 10 includes the first long carrier film 12 and the pressure-sensitive adhesive-bearing first long polarizing film 11 (including a film part 11a and a pressure-sensitive adhesive layer 11b) placed thereon, and is also configured to cut the first polarizing film 11 at specific intervals while leaving the first carrier film 12 uncut so that the first sheet piece 111 of the first polarizing film 11 is formed on the first carrier film 12. The first polarizing film 11 has an absorption axis in its longitudinal direction. The carrier film feeding unit 110 has a cutting unit 101, feed rollers 114, a dancer roll 113, and a take-up unit 115. It will be understood that FIG. 2 is a schematic diagram and the number of the feed rollers 114 and the position where they are placed are not limited to those shown in FIG. 2.

The cutting unit 101 is configured to fix the first carrier film 12 by means of a suction part 102 and to cut the first polarizing film 11 at specific intervals while leaving the first carrier film 12 uncut so that the first sheet piece 111 of the first polarizing film 11 is formed on the first carrier film 12. The cutting unit 101 may include, for example, a cutter, a laser, or any other cutting device.

The dancer roll 113 has the function of maintaining the tension on the first carrier film 12. The carrier film feeding unit 110 is configured to feed the carrier film 12 through the dancer roll 113.

The take-up unit 105 is configured to take up the first carrier film 12 from which the first sheet piece 111 has been peeled off. As a non-limiting example, the take-up unit 105 is also configured to feed the first carrier film 12 by taking up the first carrier film 12. Alternatively, for example, a downstream-side feed roller, a feed roller, or the like (not shown) may be further provided between the peeling unit 104 and the take-up unit 105, and the downstream-side feed roller may operate to feed the first carrier film 12. Alternatively, an upstream-side feed roller (not shown) may be provided upstream of the peeling unit 104 with respect to the feed direction, and the upstream-side feed roller may operate to feed the first carrier film 12. The upstream-side feed roller, the downstream-side feed roller, and the take-up unit 105 may also operate in synchronization or independently to feed the first carrier film 12.

The peeling unit 104 is configured to peel off the first sheet piece 111 (bearing the pressure-sensitive adhesive) of the first polarizing film 11 from the first carrier film 12 by inwardly folding back the first carrier film 12 at its front end and to feed the first sheet piece 111 to the bonding position in the first bonding unit 106. In this embodiment, the peeling unit 104 has a sharp knife edge at its front end. Such a structure, however, is not intended to be limiting.

The first bonding unit 106 is configured to bond the first sheet piece 111 of the first polarizing film 11, which is peeled off in the peeling unit 104, to the first cell surface Pa of the optical cell P, which is fed by the feed roller unit 90, with the pressure-sensitive adhesive 11b interposed therebetween. In this embodiment, the first bonding unit 106 includes a bonding roller 106a configured to press the first sheet piece 111 of the first polarizing film 11 against the first cell surface Pa; and a drive roller 106b (corresponding to the backing roller) opposed to the bonding roller 106a. The first bonding unit 106 performs the bonding by holding the first sheet piece 111 of the first polarizing film 11 and the optical cell P between the bonding roller 106a and the drive roller 106b and rotating the bonding roller 106a and the drive roller 106b along the feed direction.

(Rotation Unit)

The optical cell P with the first sheet piece 111 of the first polarizing film 11 bonded thereto is fed, by the feed roller unit 90, to the position where it is to be rotated in the rotation unit 80. FIG. 3 shows the rotation unit 80 and the motion of it. The rotation unit 80 has a suction plate 81 for sucking the second cell surface Pb of the optical cell P and a vertical-shift and rotation drive part 82 for lifting the suction plate 81, which sucks the optical cell P, horizontally rotating it by 90°, and placing it back on the feed roller unit 90.

The second sheet piece lamination apparatus 200 includes the same components as the first sheet piece lamination apparatus 100. The carrier film feeding unit 210 is configured to unwind the second long polarizing film laminate 20 from the second continuous roll 2, wherein the second polarizing film laminate 20 includes the second long carrier film 22 and the pressure-sensitive adhesive-bearing second long polarizing film 21 (including a film part 21a and a pressure-sensitive adhesive layer 21b) placed thereon, and is also configured to cut the second polarizing film 21 at specific intervals while leaving the second carrier film 22 uncut so that the second sheet piece 211 of the second polarizing film 21 is formed on the second carrier film 22. The second polarizing film 21 has an absorption axis in its longitudinal direction. The carrier film feeding unit 210 has a cutting unit 201, feed rollers 214, a dancer roll 213, and a take-up unit 215. It will be understood that FIG. 2 is a schematic diagram and the number of the feed rollers 214 and the position where they are placed are not limited to those shown in FIG. 2.

The cutting unit 201 is configured to fix the second carrier film 22 by means of a suction part 202 and to cut the second polarizing film 21 at specific intervals while leaving the second carrier film 22 uncut so that the second sheet piece 211 of the second polarizing film 21 is formed on the second carrier film 22. The cutting unit 201 may include, for example, a cutter, a laser, or any other cutting device.

The dancer roll 213 has the function of maintaining the tension on the second carrier film 22. The carrier film feeding unit 210 is configured to feed the carrier film 22 through the dancer roll 213.

The take-up unit 205 is configured to take up the second carrier film 22 from which the second sheet piece 211 has been peeled off. As a non-limiting example, the take-up unit 205 is also configured to feed the second carrier film 22 by taking up the second carrier film 22. Alternatively, for example, a downstream-side feed roller, a feed roller, or the like (not shown) may be further provided between the peeling unit 204 and the take-up unit 205, and the downstream-side feed roller may operate to feed the second carrier film 22. Alternatively, an upstream-side feed roller (not shown) may be provided upstream of the peeling unit 204 with respect to the feed direction, and the upstream-side feed roller may operate to feed the second carrier film 22. The upstream-side feed roller, the downstream-side feed roller, and the take-up unit 205 may also operate in synchronization or independently to feed the second carrier film 22.

The peeling unit 204 is configured to peel off the second sheet piece 211 (bearing the pressure-sensitive adhesive) of the second polarizing film 21 from the second carrier film 22 by inwardly folding back the second carrier film 22 at its front end and to feed the second sheet piece 211 to the bonding position in the second bonding unit 206. In this embodiment, the peeling unit 204 has a sharp knife edge at its front end. Such a structure, however, is not intended to be limiting.

The second bonding unit 206 is configured to bond the second sheet piece 211 of the second polarizing film 21, which is peeled off in the peeling unit 204, to the second cell surface Pb of the optical cell P, which is fed by the feed roller unit 90, with the pressure-sensitive adhesive 21b interposed therebetween. In this embodiment, the second bonding unit 206 includes a bonding roller 206a configured to press the second sheet piece 211 of the second polarizing film 21 against the second cell surface Pb; and a drive roller 206b (corresponding to the backing roller) opposed to the bonding roller 206a. The second bonding unit 206 performs the bonding by holding the second sheet piece 211 of the second polarizing film 21 and the optical cell P between the bonding roller 206a and the drive roller 206b and rotating the bonding roller 206a and the drive roller 206b along the feed direction. The optical cell P with the second sheet piece 211 of the second polarizing film 21 bonded thereto is fed to the downstream steps by the feed roller unit 90.

As shown in FIG. 2, the optical display panel LD includes the optical cell P, the first sheet piece 111 of the first polarizing film bonded to the first cell surface Pa, and the second sheet piece 211 of the second polarizing film bonded to the second cell surface Pb. The optical display panel LD may be fed to an inspection apparatus or a stocker (not shown).

(Control Unit)

A control unit (not shown) is provided to control each of the sheet piece lamination apparatuses 100 and 200. The control unit also controls the feed roller unit 90 and the rotation unit 80. For example, the timing of the operation of each unit or apparatus is calculated by a method using detection sensors placed at predetermined positions or by a method using a rotary encoder or the like for detecting the rotating part of the feed roller unit or the feed mechanism. The control unit may be implemented in cooperation with software programs and hardware resources such as CPU and memories. In this case, program software, procedures, various settings, etc. are previously stored in memories. Alternatively, the control unit may include private circuits, firmware, and others.

OTHER EMBODIMENTS

In Embodiment 1, the first and second polarizing films are MD polarizing films. This is non-limiting, and alternatively, they may be TD polarizing films. In Embodiment 1, the first polarizing film is bonded in the direction of the short side of the optical cell, and the second polarizing film is bonded in the direction of the long side. Alternatively, the first polarizing film may be bonded in the direction of the long side of the optical cell, and the second polarizing film may be bonded in the direction of the short side.

In Embodiment 1, the optical cell P is rectangular. In other embodiments, the optical cell may be square.

The process may further include an inspection step including inspecting the optical film (such as the polarizing film) for defects (for example, by transmission inspection) before the cutting step for forming the sheet piece on the carrier film, and cutting may be performed in such a manner that defects are avoided (called skip cutting) based on the result of the defect inspection step. Alternatively, the skip cutting may be performed while defect information previously attached to the optical film or the carrier film is read out.

In the embodiment, the mechanism of the rotation unit is not limited to that described above, and alternatively, for example, it may include a mechanism for lifting the optical cell from below and rotating the optical cell.

Examples

According to Embodiment 1 (FIG. 2) described above, the first bonding unit 106 was used to bond a polarizing film (SEG1423DU manufactured by Nitto Denko Corporation) to the lower surface of an optical cell (0.5 mm in thickness), and then the rotation unit 80 was used to rotate the optical cell by 90°. The optical cell was then fed to the boding position in the second bonding unit 206, at which the condition of the optical cell (whether cracking, chipping, or scratching occurred) was visually observed (the number (n) of samples: 1,000). The distance D between the rotary axes of adjacent rollers of the feed roller unit 90 and the size of the optical cell and each polarizing film were changed for every example. Between the first bonding unit 106 and the rotation unit 80, the feed roller unit 90 has 15 rollers (rotary axes) and a length of 1,190 mm. Between the rotation unit 80 and the bonding position in the second bonding unit 206, the feed roller unit 90 has 20 rollers (rotary axes) and a length of 1,615 mm.

Table 1 shows the value of D/L about the relation between the length L (mm) of the optical cell along the feed direction and the distance (D) between the rotary center axes of the rollers after the 90° rotation of the optical cell. In Example 1, the optical cell used has a short side of 229 mm and a long side of 305 mm, the distance D is 25 mm, and D/L is 0.1. In Example 2, the optical cell used has a short side of 183 mm and a long side of 244 mm, the distance D is 55 mm, and D/L is 0.3. In Example 3, the optical cell used has a short side of 128 mm and a long side of 171 mm, the distance D is 65 mm, and D/L is 0.5. In Comparative Example 1, the same conditions were used as in Example 1 except that the 90° rotation step was not performed. The size of the sheet piece of the polarizing film corresponds to the size of the optical cell. Table 1 shows the results.

TABLE 1

| | Presence or absence of 90° rotation step | D/L | Incidence (%) of cracking, chipping, and scratching defects observed(the number of defective pieces/1000) |
|---|---|---|---|
| Example 1 | Present | 0.1 | 0 |
| Example 2 | Present | 0.3 | 0.6 |
| Example 3 | Present | 0.5 | 1.3 |
| Comparative Example 1 | Absent | 0.1 | 5.8 |

In Examples 1 to 3, the incidence of cracking, chipping, or scratching of the optical cells was low, and significantly good results were obtained in comparison with those obtained in Comparative Example 1. The results obtained in Examples 1 to 3 have demonstrated that as the D/L value decreases, the incidence of cracking, chipping, or scratching decreases.

DESCRIPTION OF REFERENCE SIGNS

1 First continuous roll
12 First carrier film
11 First long polarizing film
21 Second long polarizing film
80 Rotation unit
90 Feed roller unit
106 First bonding unit
206 Second bonding unit
111 First sheet piece of first polarizing film
211 Second sheet piece of second polarizing film
P Optical cell
LD Optical display panel

The invention claimed is:

1. A method for manufacturing an optical display panel, comprising:
a feeding step comprising feeding an optical cell with a thickness of 0.2 mm to 1.0 mm by means of a feed roller unit arranged perpendicular to a direction in which the optical cell is fed;
a bonding step comprising feeding a long carrier film from a continuous roll, wherein the continuous roll is a roll of a laminate comprising the long carrier film and a pressure-sensitive adhesive-bearing optical film with a specific width placed on the carrier film, and bonding a sheet piece of the optical film, which is being peeled off or peeled off from the carrier film, to a lower surface of the optical cell with the pressure-sensitive adhesive interposed therebetween, wherein the lower surface is on a side in contact with the feed roller unit; and
a rotation step comprising rotating the optical cell by 90° with respect to the direction in which the optical cell is fed, wherein the lower surface of the optical cell is covered with the sheet piece, which is bonded in the bonding step;
wherein after the bonding step, the optical cell is curved convex upward when viewed from a side along the direction in which the optical cell is fed, and after the rotation step, the optical cell is curved convex upward when viewed from a front side with respect to the direction in which the optical cell is fed.

2. The method according to claim 1, wherein
the surface of the optical cell is rectangular,
the feeding step before the rotation step comprises feeding the optical cell by means of the feed roller unit in such a way that a short side of the optical cell is in the same direction as the direction in which the optical cell is fed, and
the bonding step comprises bonding the sheet piece to the lower surface of the optical cell with the pressure-sensitive adhesive interposed therebetween.

3. The method according to claim 2, wherein
the short side of the optical cell has a length of 100 mm to 230 mm, and
the optical cell has a long side with a length of 170 mm to 340 mm.

4. The method according to claim 3, wherein the optical cell has a side with a length L in the direction where the optical cell is fed, the feed roller unit has a distance D between adjacent roller axes, and the relation 0.5>D/L is satisfied.

5. A system for manufacturing an optical display panel, comprising:
a feed roller unit configured to feed an optical cell with a thickness of 0.2 mm to 1.0 mm and arranged perpendicular to a direction in which the optical cell is to be fed;
a bonding unit configured to feed a long carrier film from a continuous roll, wherein the continuous roll is a roll of a laminate comprising the long carrier film and a pressure-sensitive adhesive-bearing optical film with a specific width placed on the carrier film, and to bond a sheet piece of the optical film, which is being peeled off or peeled off from the carrier film, to a lower surface of the optical cell with the pressure-sensitive adhesive interposed therebetween, wherein the lower surface is on a side in contact with the feed roller unit; and
a rotation unit configured to rotate the optical cell by 90° with respect to the direction in which the optical cell is fed, wherein the lower surface of the optical cell is covered with the sheet piece, which is bonded in the bonding unit;
wherein the bonding unit is also configured to bond the sheet piece to the lower surface of the optical cell so that the optical cell is curved convex upward when viewed from a side along the direction in which the optical cell is fed, and the rotation unit is also configured to rotate the optical cell by 90° with respect to the direction in which the optical cell is fed so that the optical cell is curved convex upward when viewed from a front side with respect to the direction in which the optical cell is fed.

6. The system according to claim 5, wherein
the surface of the optical cell is rectangular,
the feed roller unit which is placed upstream of the rotation unit is configured to feed the optical cell in such a way that a short side of the optical cell is in the same direction as the direction in which the optical cell is fed, and
the bonding unit is configured to bond the sheet piece to the lower surface of the optical cell with the pressure-sensitive adhesive interposed therebetween.

7. The system according to claim 6, wherein
the short side of the optical cell has a length of 100 mm to 230 mm, and
the optical cell has a long side with a length of 170 mm to 340 mm.

8. The system according to claim 7, wherein the optical cell has a first side with a length L in the direction where the optical cell is fed, the feed roller unit has a distance D between adjacent roller axes, and the relation 0.5>D/L is satisfied.

* * * * *